United States Patent [19]

Stephan et al.

[11] 4,374,076
[45] Feb. 15, 1983

[54] METHOD FOR MAKING CAST EPOXY RESIN BODIES AND EPOXY FORMULATION THEREFOR

[75] Inventors: James E. Stephan, Arvada; Paul A. Boduch, Lakewood; John A. Elverum, Englewood, all of Colo.

[73] Assignee: Coors Porcelain Company, Golden, Colo.

[21] Appl. No.: 310,170

[22] Filed: Oct. 9, 1981

[51] Int. Cl.³ .......................... B29C 5/00; A61C 13/08
[52] U.S. Cl. ........................................ 264/19; 264/53; 264/225; 264/234; 525/504; 525/507; 528/103
[58] Field of Search ................ 528/103; 525/504, 507; 264/16–19, 219, 225, 234

[56] References Cited

U.S. PATENT DOCUMENTS

| | | | |
|---|---|---|---|
| 3,063,965 | 11/1962 | Colclough | 525/504 |
| 3,098,059 | 7/1963 | Van Strien et al. | 525/507 |
| 3,438,849 | 4/1969 | Isack | 528/103 |
| 3,632,836 | 1/1972 | Walker et al. | 528/103 |
| 3,860,561 | 1/1975 | Vargiu et al. | 525/507 |
| 3,985,695 | 10/1976 | Tobias et al. | 528/103 |
| 4,007,160 | 2/1977 | Turley | 528/103 |
| 4,040,994 | 8/1977 | Lewis et al. | 528/103 |
| 4,054,635 | 10/1977 | Schlesinger et al. | 264/219 |
| 4,101,518 | 7/1978 | Takamori et al. | 528/103 |

FOREIGN PATENT DOCUMENTS 227790 7/1958 Australia .......................... 528/103

*Primary Examiner*—Willard E. Hoag
*Attorney, Agent, or Firm*—Reising, Ethington, Barnard, Perry & Brooks

[57] ABSTRACT

A method for making cast precision epoxy resin bodies and an epoxy resin formulation for use therein, the epoxy resin formulation having Component A consisting essentially of from 40 to 70% by weight epoxy novolac polymer, from 30 to 50% by weight vinyl -3-cyclohexene diepoxide and from 0 to 20% by weight 3,4 epoxy cyclohexylmethyl -3,4-epoxy cyclohexane carboxylate and Component B consisting essentially of partially hydrolyzed aryl tetracarboxylic acid dianhydride, preferably partially hydrolyzed pyromellitic acid dianhydride. In the preferred embodiments a tertiary amine catalyst is also included. These components are mixed, just before use, in a ratio of from 20 to 50 parts by weight Component B to each 100 parts by weight Component A. To make the cast precision bodies such mixture is cast in a mold of the shape desired, allowed to cure to a solid body while in the mold, and thereafter heated to cause permanent expansion thereof at least sufficient to compensate for any shrinkage occurring during the casting and hardening thereof while in the mold.

21 Claims, 1 Drawing Figure

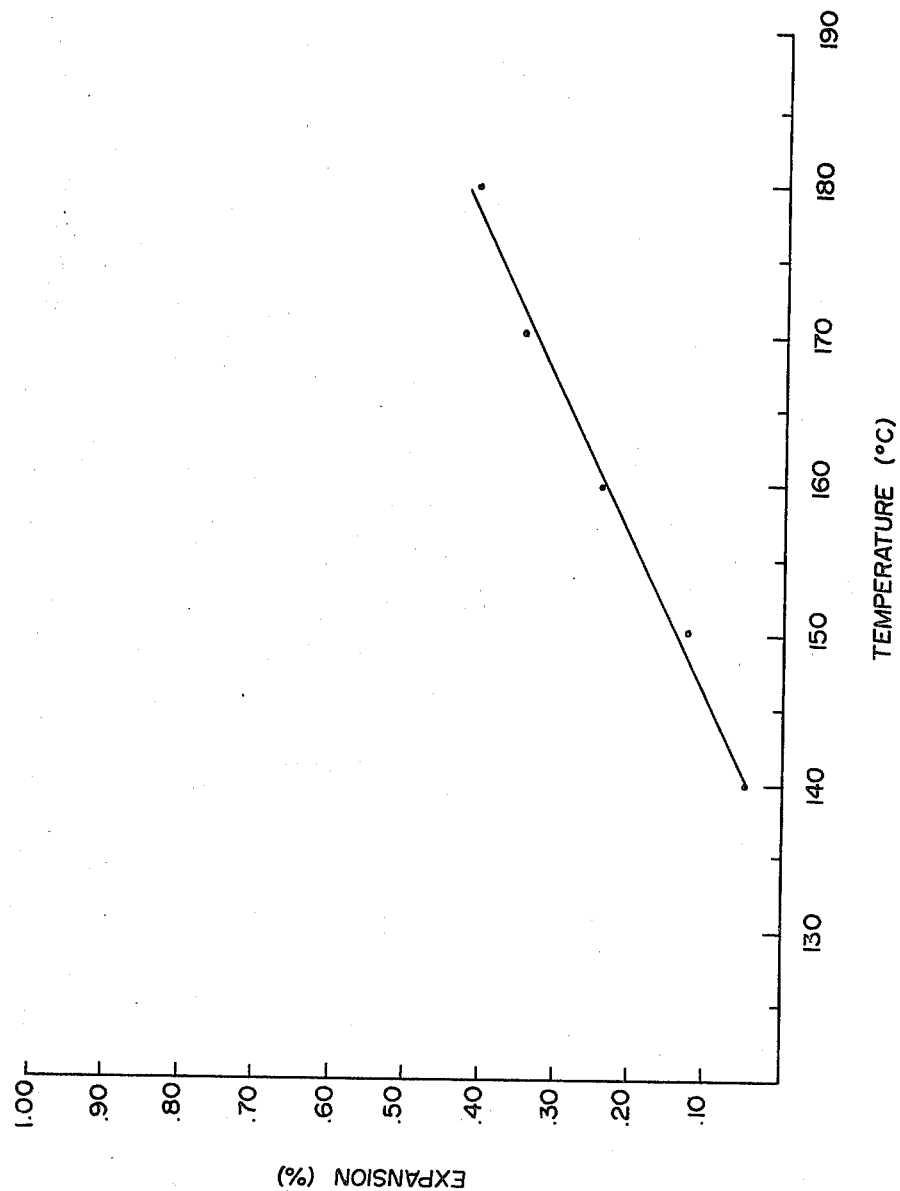

METHOD FOR MAKING CAST EPOXY RESIN BODIES AND EPOXY FORMULATION THEREFOR

TECHNICAL FIELD

The subject matter of this invention is a method for making cast epoxy resin bodies to close tolerances and an epoxy resin formulation for use in making such bodies. The invention has particular utility and advantages for making tooth models for the preparation of dental crowns and hence will be described chiefly with reference thereto, though the invention has utility in many other fields.

BACKGROUND ART

In the manufacture of a tooth crown or the like dental appliance custom-made for fixed permanent securement to a prepared natural tooth, an impression is taken of the prepared natural tooth in a pliant material and a model of the prepared natural tooth is then made by molding a hardenable material in the impression which functions as a mold. Such a model is sometimes otherwise referred to as a die, a master die, or a tooth replica, the term "model" as used herein being intended as generic to all such models, dies, master dies and tooth replicas. With such model having been made, the conventional practice is to form a wax coping on the model, invest the wax coping in an investment material, melt out the wax after the investment material has hardened thereby to form a mold cavity, and then mold or cast the dental crown in the mold cavity. A disadvantage to this method is that no matter how accurate the definition of the model is in precisely duplicating the shape of the prepared tooth, some of the definition is lost in transference of the shape to the investment material by way of the wax coping. U.S. patent application Ser. No. 103,647 filed Dec. 14, 1979 discloses and claims a method for making ceramic dental crowns and the like dental appliances wherein the model itself is used as a wall of the mold cavity thereby eliminating any loss whatsoever of definition in the construction of the mold cavity. The method of the present invention is advantageous for the preparation of tooth models for the older conventional method and for the method of the aforementioned patent application, but especially for the latter.

Tooth models have heretofore been made of epoxy resins; however, the disadvantage has been that during the curing of the epoxy resins to hardness there is some shrinkage to the end that the resulting model is not an exact duplicate of the prepared natural tooth but instead is reduced in size. The method and epoxy resin formulation of the present invention correct this deficiency to the end that by the practice of the invention tooth models can be prepared which are not only strong and hard but which are also of precisely the shape and size desired.

DISCLOSURE OF THE INVENTION

The epoxy resin formulation of the present invention has as one of its outstanding characteristics that after it has been mixed, molded and cured to a solid body, the solid body can be caused to undergo controlled permanent expansion by a post-cure heat treatment. Hence, by the post-cure heat treatment there can be compensation for any shrinkage which has occurred during curing of the resin.

The epoxy resin formulation has components designated as Component A and Component B. Component A consists essentially of from about 40 to 70% by weight epoxy novolac polymer wherein n (the average number of intermediate repetitive groups) is preferably from 0.2 to 1.8; from about 30 to 50% by weight vinyl-3-cyclohexene diepoxide and from 0 to about 20% by weight 3,4 epoxy cyclohexylmethyl-3,4-epoxy cyclohexane carboxylate. Component B consists essentially of partially hydrolyzed aryl tetracarboxylic acid dianhydride, preferably partially hydrolyzed pyromellitic acid dianhydride. These two components, separately packaged until just before use, are mixed in a ratio of from about 20 to 50 parts by weight Component B to each 100 parts by weight Component A whereupon they undergo polymerization reaction to form the resin body.

As discussed in detail hereinafter, particularly if Component B is close to 100% of the aryl tetracarboxylic acid dianhydride, then a third component, also separately packaged until just before use, should preferably be included. This third component is a tertiary amine and is added in an amount of up to about 0.03 parts by weight for each part by weight of combined Components A and B, all for the reasons discussed hereinafter.

In the practice of the method of the invention the mixture, freshly prepared by mixing Components A and B, and the third component if required, is poured into the impression taken of the prepared tooth and is allowed to cure to hardness while in the impression. The resulting hard resin body, removed from the impression, is thereafter heated to cause its permanent expansion at least sufficiently to compensate for the shrinkage occurring during the curing of the resin to hardness while in the impression. Hence, by reason of the ability of the cured bodies to be controllably expanded by a post-cure heat treatment, the formulation of the invention has great utility for making molded epoxy resin bodies to precise tolerances and by the method of the invention strong, hard epoxy resin tooth models can be made which are precise replicas of the prepared natural teeth as to which the models are made.

These and other features and advantages of the invention will appear more clearly from the detailed description of preferred embodiments which follows.

DESCRIPTION OF THE DRAWING

The drawing is a graph which illustrates the effect of temperature on the expansion of an epoxy resin body made in accordance with the invention during the post-cure heat treatment.

BEST MODE FOR CARRYING OUT THE INVENTION

Materials for and preparation of Component A

It is preferred that the epoxy novolac polymer have an n of about 0.6. The epoxy novolac polymer sold by the Dow Chemical Company of Midland, Mich. under its designation Epoxy Novolac DEN 438 is excellent for practice of the invention.

The most preferred ranges for the Component A ingredients are (all percentages herein being by weight): from about 50 to 65% of of the epoxy novolac polymer; from about 35 to 45% vinyl-3-cyclohexene diepoxide;

and from 0 to 10% 3,4 epoxy cyclohexylmethyl-3,4-epoxy cyclohexane carboxylate.

Table I sets forth three examples of preferred formulations for Component A, the formulation of Example 3 being the best, particularly by reason of the somewhat increased toughness of the cured bodies prepared with it.

TABLE I

| Component | EXAMPLE 1 | EXAMPLE 2 | EXAMPLE 3 |
|---|---|---|---|
| epoxy novolac polymer | 60% | 62% | 52% |
| vinyl -3-cyclo-hexene diepoxide | 40% | 38% | 40% |
| 3,4 epoxy cyclohexyl-methyl -3,4-epoxy cyclo-hexane carboxylate | 0% | 0% | 0% |

Component A is best prepared by first preheating the epoxy novolac polymer to about 60° C., which lowers its viscosity, after which the vinyl-3-cyclohexene diepoxide and the 3,4 epoxy cyclohexylmethyl-3,4-epoxy cyclohexane carboxylate, if used, are added to the preheated novolac in the precise proportions desired within the above ranges. The mixture is then vigorously mixed while at such temperature until a homogenous mixture is attained, after which the mixture can be allowed to cool to room temperature. Such mixing can be accomplished within a few minutes, generally less, depending on the size of the batch.

Materials for Component B

The preferred aryl tetracarboxylic acid dianhydrides for use as Component B are partially hydrolyzed pyromellitic acid dianhydride and partially hydrolyzed 3,4 benzophenone tetracarboxylic acid dianhydride, the former being best. The dianhydride should preferably be of micromesh particle size (typically 6 to 13 microns), as distinguished from a coarser particle size, since with the micromesh particle size there is better assurance that when Component B is mixed with Component A just prior to use, complete solubility occurs at room temperature within a short period.

In the early stages of the work on this invention it was found that even with total formulations (i.e. the formulation of Component A and the formulation of Component B), thought to be identical, the results are not always the same particularly in that there were significant differences in attaining a cure and the times required for attaining a cure of the resulting resin. Upon investigation it was discovered that such variations were due to variations in the precise composition of the partially hydrolyzed pyromellitic acid dianhydride used. More specifically, the composition can vary from one where it is close to 100% dianhydride to others where it contains greater amounts of the tetracarboxylic acid or the monoanhydride thereof, i.e. the products of hydrolysis of the dianhydride. It was then further found that where that which was used as Component B contained substantial amounts of the products of hydrolysis, i.e. an excess of about 10% of the tetracarboxylic acid or the monoanhydride thereof, the reactivity of such Component B with Component A was substantially higher than where that which was used as Component B consisted almost entirely of the dianhydride. Where Component B does contain substantial amounts of the tetracarboxylic acid and/or its monoanhydride, the reactivity of such Component B with Component A is sufficiently high that no catalyst is required, nor is a catalyst desirable, in that with a catalyst present the rate of reaction is sufficiently great that it is more difficult to control. On the other hand, where that which is used as Component B is close to 100% dianhydride, then it is desirable to include as a third ingredient a small amount of a tertiary amine to catalyze the cure reaction. The amine need only be included in an amount up to about 0.06 parts by weight for each part by weight of combined Components A and B. Benzyl dimethyl tertiary amine is preferred, though other tertiary amines can be used, examples being (dimethyl amino methyl) phenol and tri (dimethyl amino methyl) phenol. The use of tertiary amines as catalysts in making epoxy resins is, of course, per se well known in the art.

The use, as Component B, of 100% dianhydride, with no products of hydrolysis whatsoever, is impractical and undesirable, for one reason because of its very low reactivity with Component A. On the other hand, a composition consisting entirely of the hydrolysis products, i.e. consisting entirely of the tetracarboxylic acid, the monoanhydride, or mixtures thereof, is not desirable as Component B because its reactivity is greater than desired. It is preferred that Component B contain no less than 50% of the dianhydride and it is best that it contain more than 90% of the dianhydride, the remainder in all cases being the products of hydrolysis of the dianhydrides. As has been indicated above, if the dianhydride content of Component B exceeds about 90% then a catalyst is desirable to provide a good but not excessive rate of reaction during curing and also to provide optimum post-cure permanent expansion characteristics as now to be discussed.

Whereas the invention can be practiced without requirement for the catalyst and whereas, for the reason stated, the presence of a catalyst is undesirable where Component B contains a high percentage of the hydrolysis products, from the standpoint of the post-cure permanent expansion characteristics of the cast bodies made, the presence of catalyst is always advantageous. Hence it is that it is preferred that the dianhydride content of Component B be sufficiently high that the mixed formulation of Components A and B can accept the presence of catalyst without being excessively reactive during the mixing and during cure in the mold. For this reason it is preferred that Component B contain more than about 90% dianhydride and that the total formulation include the catalyst. However, the greater the dianhydride content of Component B, the less the amount of catalyst required to provide the optimum results, both in cure and in post-cure heat treatment. Even with a Component B composition containing less than 2% hydrolysis products there is no need for more than about 0.06 parts by weight of the catalyst for each part by weight of combined Components A and B. At the other end of the scale, even where the Component B composition contains about 10% hydrolysis products, the formulation can accept a small but effective amount of the catalyst, say 0.005 parts by weight for each part by weight combined Components A and B and the presence of the catalyst, even in such small amount, is desirable for the post-cure heat treatment. A typical such preferred formulation is one wherein Component B contains about 94% dianhydride and wherein the amount of catalyst used is 0.03 parts by weight for each part by weight of combined Components A and B.

As has been previously mentioned, the catalyst, if used, should be packaged and maintained separate from Components A and B, just as A and B are themselves packaged and maintained separate from each other, until just prior to use. Where, as will generally be the case, the components are supplied to rather than made by the end user, the problem presents itself that if the composition of Component B is not constant from shipment to shipment to the end user, then, for optimum uniform results the formulation supplied to the user would at times require and at other times not require the inclusion of the third component, i.e. the tertiary amine catalyst. For this reason it is preferred that Component B either uniformly contain in excess of about 90% of the dianhydride, and with the total formulation preferably including the catalyst, or, alternatively, that Component B uniformly contain a lesser amount of the dianhydride and with the total formulation preferably not including the catalyst. Either alternative is satisfactory; however, for optimum results the former is preferred.

Additional Ingredients Desirable for Component A

In addition to the aforementioned ingredients of Component A, it is much preferred that it also include a small amount, approximately 0.125%, of an anti-foaming agent such as a liquid silicone as marketed for this purpose by the Dow Chemical Company of Midland, Mich. This better assures that when the components are mixed there will be minimal trapped air or other gas in the resulting epoxy resin. It is also generally desirable to include a small amount, approximately 0.2% by weight, of a conventional coloring die for epoxy resins as well known in the art and as available on the market, for example from the Emerson-Cumming Company of Canton, Mass.

Most Preferred Ratio of Components A and B

For optimum results the best ratio for Components A and B is: about 30 parts by weight Component B for each 100 parts by weight Component A.

PRACTICE OF THE METHOD

Components A and B, and the third component if it is used, are mixed for a few minutes, the exact mixing time being dependent on the size of the batch being mixed. It is preferred that the mixture then be placed in a vacuum chamber and de-aired under a vacuum of about 27–30″ of Hg for approximately 1 to 3 minutes, the exact time again being dependent on the size of the batch. The next step is to put the liquid epoxy into the impression of the prepared tooth of which a model is desired. To best assure optimum conformity of the epoxy to the impression, it is best that some of the epoxy first be brushed onto all of the surfaces of the impression after which the epoxy is poured into the impression until it is filled. The epoxy is then allowed to cure for about 8 hours minimum at room temperature. A cure at room temperature is preferred to a cure at higher temperature even though the latter shortens the curing time.

At the end of the 8 hours the cured epoxy resin body is removed from the impression and allowed to remain, or is maintained, at room temperature until the post-cure heat treatment is performed as will hereinafter be described. The epoxy resin body at this stage is of slightly lesser dimensions than those of the impression, and hence those of the prepared tooth, due to the slight shrinkage which occurs during curing.

The cured epoxy resin body is placed in an oven which is at room temperature when the resin body is placed therein, and the temperature of the oven is then increased, preferably at a rate of from about 5° to 25° C. per minute. As the temperature of the resin body increases the body gradually permanently expands. The precise permanent expansion characteristics of any given resin body made in accordance with the invention depends upon the precise formulation of which it is made. However, bodies made of the same formulation uniformly have the same permanent expansion characteristics. Hence, the manufacturer of the formulation can by tests determine the precise expansion characteristics and provide this information to the user. Generally, though not always, the user will wish to attain an expansion which precisely compensates for the shrinkage during curing. The amount of shrinkage during curing is generally from about 0.02% to 0.6%, the precise shrinkage characteristics again being dependent upon the precise formulation of which the body is made. The manufacturer of the formulation can, by measurement, obtain this information also and supply it to the user. With respect to a given precise formulation the instructions given to the user might typically be that to cause a permanent expansion which precisely compensates for the shrinkage which has occurred during curing, the cured body should be heated from room temperature to 160° C. at a rate of 10° C. per minute and then held at the 160° C. for 1 hour. For none of the embodiments of the invention is there requirement to exeed about 200° C. in the post-cure heat treatment in order to attain the desired permanent expansion.

The drawing shows the expansion characteristics of a body made of an Example 3 formulation in accordance with the invention. The rate of heating was 20° C. per minute and, in the case of each of the plotted points, with a hold of two hours at the temperature indicated by the plotted point. The precise measured expansions, represented by the graph, were: 0.04% at 140° C.; 0.12% at 150° C.; 0.24% at 160° C.; 0.34% at 170° C.; 0.41% at 180° C. It will be seen, therefore, that the amount of permanent expansion attained depends on the temperature to which the body is heated. Because the permanent expansion is gradual there can be excellent control.

The hold time at the top temperature to which the body is heated is not critical but at least some hold time, preferably at least 30 minutes, at the top temperature is in all cases desirable to assure that such temperature is reached throughout the entire body.

Immediately after the heat treatment, i.e. immediately after the heat treated body is removed from the oven, it is best that it be rapidly cooled to room temperature.

Because the permanent expansion is so gradual, even when for a short period, say a couple of minutes, the body is subsequently exposed to a high temperature, there is no change in permanent expansion. Therefore, after the post-cure heat treatment, when a tooth model made in accordance with the invention is used as the wall of a mold cavity for molding a tooth crown of a material which is at high temperature when injected into the mold and while being molded, the tooth model does not take an additional increment of permanent expansion since the molding time is short.

In one particular embodiment of the method of the invention the post-cure heat treatment is such as to cause the tooth model to permanently expand to a size minutely greater than the size of the impression in which it was cast to the end that when the tooth crown is molded against the model, the resulting recess in the crown will be minutely larger than the prepared tooth. Hence, when the completed crown is secured to the prepared tooth the fit is perfect with just sufficient spacing to accommodate a very thin layer of cement for securing the crown to the tooth. This illustrates the excellent close control of the permanent expansion which can be accomplished in the heat treatment.

The precise reasons for the permanent expansion accomplished by the post-cure heat treatment are not at this time fully understood; however, it is believed that during the heat treatment there may be some further cross linking of the polymer which generates water and with the water then causing or contributing to the expansion which occurs.

As indicated earlier, while the invention has particular utility and advantages for making tooth models and has been described largely with reference to this use, it also has utility in other fields such as for making cast epoxy resin industrial tools and the like where exact casting replication is required. Also, it will be understood that while the invention has been described specifically with reference to preferred embodiments thereof, various changes and modifications may be made all within the full and intended scope of the claims which follow.

What is claimed is:

1. A method for making a cast epoxy resin body to close shape tolerances, said method comprising:
    forming a uniform mixture of Components A and Component B in a ratio of about from 20 to 50 parts by weight Component B to each 100 parts by weight Component A, Component A consisting essentially of from about 40 to 70% by weight epoxy novolac polymer, from about 30 to 50% by weight vinyl-3-cyclohexene diepoxide and from 0 to about 20% by weight 3,4 epoxy cyclohexylmethyl-3,4-epoxy cyclohexane carboxylate; and Component B consisting essentially of partially hydrolyzed aryl tetracarboxylic acid dianhydride.
    casting said mixture in a mold, said mixture being allowed to remain in the mold until it cures to a solid body; and
    heating said solid body for a sufficient time and at a sufficient temperature to cause it to permanently expand at least sufficiently to compensate for the shrinkage of said body which occurred during the curing thereof in the mold.

2. A method as set forth in claim 1 wherein the average number of intermediate repetitive groups in the epoxy novolac polymer is from 0.2 to 1.8.

3. A method as set forth in claim 1 wherein Component B is at least 50% by weight dianhydride.

4. A method as set forth in claim 1 wherein Component B is more than 90% dianhydride and wherein a tertiary amine catalyst is included in said mixture in an amount up to about 0.06 parts by weight for each part by weight of combined Components A and B.

5. A method as set forth in claim 1, 2, 3 or 4 wherein Component B is partially hydrolyzed pyromellitic acid dianhydride.

6. A method as set forth in claim 1 wherein the solid body is heated at a rate of from about 5° to 25° C. per minute.

7. A method as set forth in claim 6 wherein the solid body is heated for a sufficient time and at a sufficient temperature to cause it to permanently expand to a size slightly larger than that of the mold in which the body was cast.

8. A method as set forth in claim 1 wherein Component A contains about 52% epoxy novolac polymer wherein the average number of intermediate repetitive groups is about 0.6, about 40% vinyl-3-cyclohexane diepoxide and about 8%, 3,4 epoxy cyclohexylmethyl-3,4-epoxy cyclohexane carboxylate, and wherein Component B is partially hydrolyzed pyromellitic acid dianhydride containing at least 90% by weight of the dianhydride.

9. A method as set forth in claim 8 wherein there is included in the mixture of Components A and B a tertiary amine catalyst in an amount up to 0.06 parts by weight for each part by weight of combined Components A and B.

10. A method as set forth in claim 9 wherein Components A and B are mixed in a ratio of about 30 parts by weight Component B for each 100 parts by weight Component A.

11. A formulation for making a cured epoxy resin solid body characterized by its ability to undergo controlled permanent expansion by controlled post-cure heating thereof, said formulation having the following Components A and B which, when mixed with each other in a ratio of from 20 to 50 parts by weight Component B to each 100 parts by weight Component A, undergo polymerization reaction to form the body:
    Component A—consisting essentially of from about 40 to 70% by weight epoxy novolac polymer; from about 30 to 50% by weight vinyl-3-cyclohexene diepoxide; and from about 0 to 20% by weight 3,4 epoxy cyclohexylmethyl-3,4-epoxy cyclohexane carboxylate:
    Component B—consisting essentially of partially hydrolyzed aryl tetracarboxylic acid dianhydride.

12. A formulation as set forth in claim 11 wherein the average number of intermediate repetitive groups in the epoxy novolac polymer is from 0.2 to 1.8.

13. A formulation as set forth in claim 11 wherein Component B is at least 50% by weight dianhydride.

14. A formulation as set forth in claim 11 wherein Component B is more than 90% pyromellitic acid dianhydride and wherein a tertiary amine catalyst is included in said mixture in an amount up to about 0.06 parts by weight for each part by weight of combined Components A and B.

15. A formulation as set forth in claim 11, 12, 13 or 14 wherein Component B is partially hydrolyzed pyromellitic acid dianhydride.

16. A formulation as set forth in claim 11 wherein Component A contains about 52% epoxy novolac polymer, about 40% vinyl-3-cyclohexene diepoxide and about 8%, 3,4 epoxy cyclohexylmethyl-3,4-epoxy cyclohexane carboxylate, and wherein Components A and B are mixed in a ratio of about 30 parts by weight Component B for each 100 parts by weight Component A.

17. A formulation as set forth in claim 16 wherein Component B is partially hydrolyzed pyromellitic acid dianhydride.

18. A formulation as set forth in claim 17 wherein Component B contains at least 90% by weight dianhydride and wherein there is included in the mixture of Components A and B a tertiary amine catalyst in an amount up to 0.06 parts by weight for each part by weight of combined Components A and B.

19. In a method for making a permanent custom-fitted crown or the like dental appliance member for permanent securement to a natural tooth by a thin layer of cement, comprising the steps of (1) molding a model of the prepared tooth in an impression taken of the prepared tooth in an impression material; (2) constructing a mold such that the mold has a wall at least substantially the same in shape and size as the model; and (3) molding the crown or like dental appliance member in the mold whereby the member has a recess of a shape and size to fit onto the prepared tooth; the improvement comprising making the model molded in the impression of an epoxy resin formulation as set forth in claim 1, 11, 12, 13, 14, 15, 16, 17 or 18, curing the model to a solid body while in the impression, and thereafter but prior to constructing the mold heating the model sufficiently and for a sufficient period to cause permanent expansion of said model at least sufficiently to compensate for shrinkage occurring during the curing thereof.

20. A method as set forth in claim 19 wherein the mold is constructed with the model itself as the said wall of the mold.

21. A method as set forth in claim 20 wherein the heating of the model is sufficient to cause its permanent expansion to a size sufficiently greater than the prepared tooth and the impression made thereof so that the recess in the member which is molded against the model is such as to accommodate the thin layer of cement when the member is secured to the natural tooth.

* * * * *

UNITED STATES PATENT AND TRADEMARK OFFICE
CERTIFICATE OF CORRECTION

PATENT NO. : 4,374,076

DATED : February 15, 1983

INVENTOR(S) : James E. Stephan; Paul A. Boduch; John A. Elverum

It is certified that error appears in the above—identified patent and that said Letters Patent is hereby corrected as shown below:

Column 3, TABLE I, EXAMPLE 3, at the bottom of the listings of percentages delete "0%" and insert --8%--.

Signed and Sealed this

Twenty-eighth Day of June 1983

[SEAL]

Attest:

GERALD J. MOSSINGHOFF

*Attesting Officer*  *Commissioner of Patents and Trademarks*